(12) United States Patent
Sato

(10) Patent No.: US 7,193,648 B1
(45) Date of Patent: Mar. 20, 2007

(54) PHOTOGRAPHING OPERATION CONTROL DEVICE FOR ELECTRONIC STILL CAMERA

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 705 days.

(21) Appl. No.: 09/665,413

(22) Filed: Sep. 20, 2000

(30) Foreign Application Priority Data

Sep. 27, 1999 (JP) ............................... P11-272512

(51) Int. Cl.
*H04N 5/76* (2006.01)
(52) U.S. Cl. ............................... 348/231.1; 348/231.2; 348/231.9
(58) Field of Classification Search ........... 348/231.99, 348/231.1, 231.7, 231.9, 321.2, 321.7, 321.9
See application file for complete search history.

(56) References Cited

U.S. PATENT DOCUMENTS 5,956,084 A * 9/1999 Moronaga et al. ....... 348/231.9
6,538,692 B2 * 3/2003 Niwa ....................... 348/231.1
6,549,232 B1 * 4/2003 Taniguchi et al. ...... 348/231.99
2001/0015760 A1 * 8/2001 Fellegara et al. ........... 348/231
2003/0058355 A1 * 3/2003 Wong et al. ........... 348/231.99

* cited by examiner

*Primary Examiner*—Vivek Srivastava
*Assistant Examiner*—Gevell Selby
(74) *Attorney, Agent, or Firm*—Greenblum & Bernstein, P.L.C.

(57) ABSTRACT

A photographing operation control device comprises a buffer memory in which image data is temporarily stored. In a blank photographing mode, when a release switch is turned ON, image data obtained through a photographing optical system is stored in the buffer memory. In the blank photographing mode, the image data stored in the buffer memory is not recorded in a PC card. In a normal photographing mode, when the release switch is turned ON, the image data is stored in the buffer memory and then transmitted to the PC card, in which the image data is recorded.

18 Claims, 5 Drawing Sheets

US 7,193,648 B1

PHOTOGRAPHING OPERATION CONTROL DEVICE FOR ELECTRONIC STILL CAMERA

BACKGROUND OF THE INVENTION

1. Field of the Invention

The present invention relates to a device provided in an electronic still camera and more particularly to a device which controls a photographing operation.

2. Description of the Related Art

Conventionally, in an electronic still camera, an image signal corresponding to an image obtained through a photographing optical system, is generated in a solid state imaging device (CCD), from which the image signal is read, and the image signal is temporarily stored in a buffer memory. When image data of one frame is stored in the buffer memory, the image data is read from the buffer memory and transferred to a recording medium in which the image data is recorded. Thus, in a photographing operation, a series of operations including a storing operation, a transferring operation and a recording operation are essential. Therefore, when a recording medium is not in place, or when a necessary blank recording area does not exist even if the recording medium is in place, the photographing operation cannot be performed.

Therefore, in a case such as a test photographing operation, in which it is not necessary to record the image data in the recording medium, it is necessary that a recording medium having a sufficient blank recording area is in place in the camera body. Further to the test photographing operation, an unnecessary image data should be deleted after performing the storing, transferring and recording operations, and thus, the next test photographing operation cannot be promptly initiate.

SUMMARY OF THE INVENTION

Therefore, an object of the present invention is to provide a photographing operation control device for an electronic still camera, which can perform a photographing operation even when a recording medium is not mounted or a blank recording area is not sufficient.

According to the present invention, there is provided a photographing operation control device for an electronic still camera, the device comprising a buffer memory and a blank photographing operation performing processor.

In the buffer memory, image data obtained through a photographing optical system is temporarily stored. The blank photographing operation performing processor performs a photographing operation in a blank photographing mode in which the image data is stored only in the buffer memory.

BRIEF DESCRIPTION OF THE DRAWINGS

The objects and advantages of the present invention will be better understood from the following description, with reference to the accompanying drawings, in which.

DESCRIPTION OF THE PREFERRED EMBODIMENTS

Figure 1:
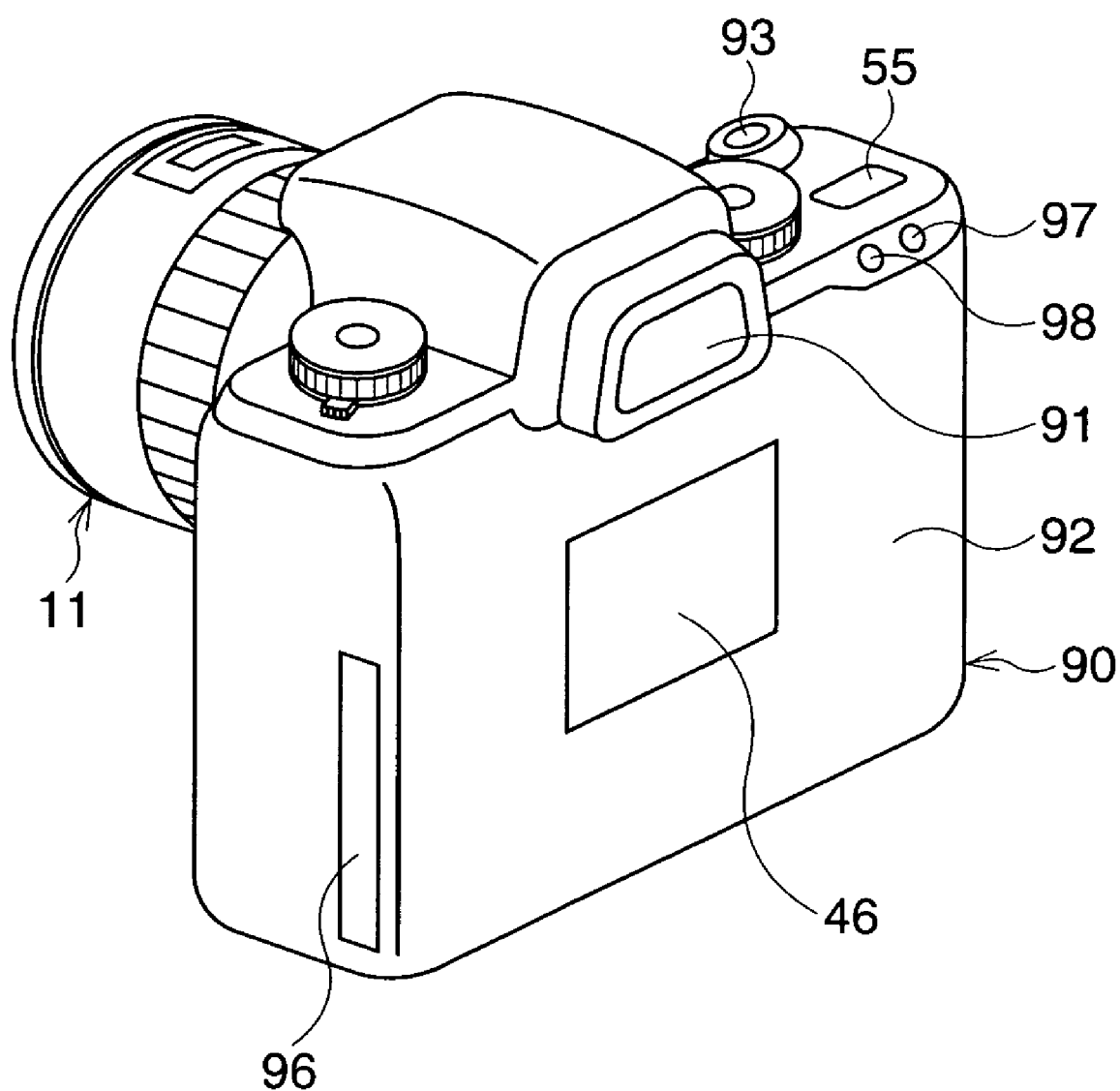
FIG. 1 is a perspective view of an electronic still camera, which is viewed from the back, the camera having a photographing operation control device of a first embodiment of the present invention.

The present invention will be described below with reference to the embodiments shown in the drawings.

FIG. 1 is a perspective view of an electronic still camera, which is viewed from the back, the camera having a photographing operation control device of a first embodiment of the present invention.

The electronic still camera is a single-lens reflex camera, and an interchangeable lens 11 is detachably connected to the camera body 90. An optical view-finder 91 is provided on the center of the upper surface of the camera body 90. A liquid crystal display panel 46 is provided at the center of the rear surface of the camera body 90, so that a still image, which is stored in a buffer memory 40 (see FIG. 2) by a photographing operation, can be indicated on the liquid crystal display panel 46.

When viewing the camera body 90 from the side of the rear surface 92, a shutter button 93 and a condition indicating device 55 are provided on an upper-right portion of the camera body 90. The condition indicating device 55 includes a liquid crystal display panel, by which various kinds of setting conditions of the electronic still camera are indicated as a character or symbol. A photographing mode set switch 97 and a record switch 98 are provided close to the condition indicating device 55. As described later, the photographing mode set switch 97 is operated so that a photographing operation is switched between a normal photographing mode and a blank photographing mode, and the record switch 98 is operated so that an image data stored in the buffer memory 40 (see FIG. 2) is transmitted to a PC card.

A card slot 96 is formed in a side surface of the camera body 90. The card slot 96 is provided for inserting a recording medium, such as a PC card or a memory card, into the camera body 90, and a card connector (not shown), to which the recording medium is attached, is provided in the card slot 96.

Figure 2:
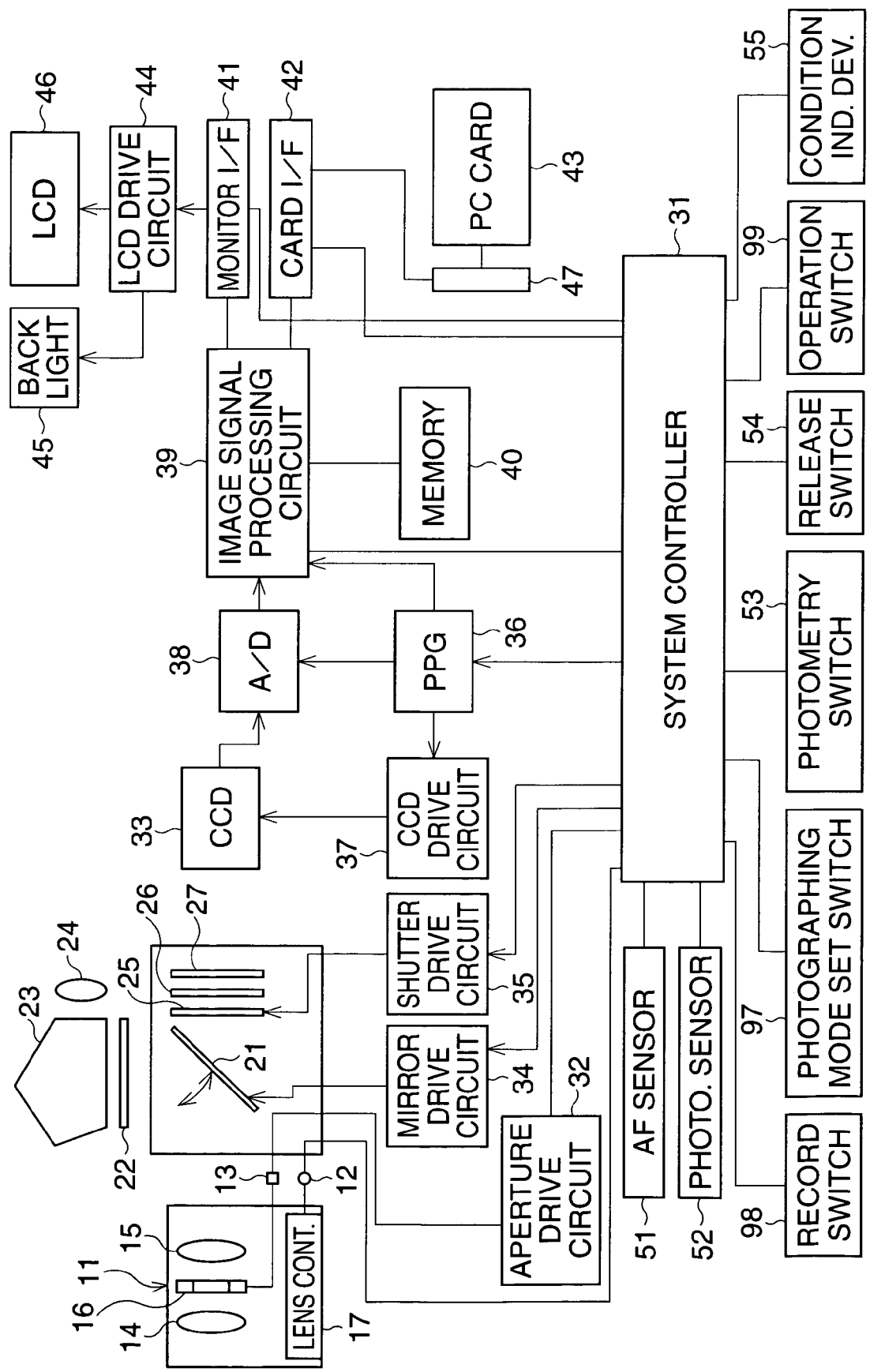
FIG. 2 is a block diagram of the electronic still camera, which shows mainly an electric construction.

FIG. 2 is a block diagram of the electronic still camera, showing mainly an electrical construction.

The interchangeable lens 11 is electrically connected to an electric circuit provided in the camera body 90 (see FIG. 1) through mount pins 12 and 13. A front lens group 14 and a rear lens group 15, which form a photographing optical system of the electronic still camera, are mounted in a lens barrel of the interchangeable lens 11, and an aperture 16 is provided between the lens groups 14 and 15. Each of the lens groups 14 and 15 is displaced in the optical axis direction under control of a lens control circuit 17, so that a focusing adjustment can be carried out. The lens control circuit 17 is operated in accordance with a control signal transmitted through the mount pin 12 from the system controller 31 provided in the camera body. The aperture 16 is operated in accordance with a control signal transmitted through the mount pin 13 from an aperture drive circuit 32 provided in the camera body, so that the opening degree of the aperture 16 is adjusted. The aperture drive circuit 32 is controlled by the system controller 31.

In the camera body, a quick return mirror 21 is disposed on the optical axis of the lens groups 14 and 15. The quick return mirror 21 is rotatable between an inclined state shown in the drawing and a horizontal state in which the quick return mirror 21 is rotated upward. A focusing glass 22 is provided above the quick return mirror 21, and a pentagonal prism 23 is arranged above the focusing glass 22. An eyepiece lens 24 of a view-finder is disposed behind the pentagonal prism 23.

A shutter 25 is provided behind the quick return mirror 21, and an infrared cut filter 26 and an optical low-pass filter 27 are arranged behind the shutter 25. A CCD (i.e., an imaging device) 33 is provided behind the optical low-pass filter 27. Namely, the quick return mirror 21, the shutter 25, the infrared cut filter 26 and the CCD 33 are aligned on the optical axis of the lens groups 14 and 15.

A rotating operation of the quick return mirror 21 is driven by a mirror drive circuit 34, and an open-close operation of the shutter 25 is driven by the shutter drive circuit 35. The mirror drive circuit 34 and the shutter drive circuit 35 are controlled by the system controller 31.

Usually, the mirror 21 is set to an inclined state, so that light passing through the interchangeable lens 11 is led to the pentagonal prism 23. In this state, the shutter 25 is closed, so that an optical path to the CCD 33 is shut or closed. Conversely, when a photographing operation is carried out, the mirror 21 is upwardly rotated under control of the mirror drive circuit 34 and set to the horizontal state. With the rotation of the mirror 21, the shutter 25 opens under control of the shutter drive circuit 35 so that light passing through the interchangeable lens 11 is radiated on a light receiving surface of the CCD 33. Namely, an image obtained through the lens groups 14 and 15 is formed on the light receiving surface, and thus, an image signal corresponding to the image, is generated in the CCD 33.

A pulse signal generator (PPG) 36 is connected to the system controller 31, so that the pulse signal generator 36 generates various kinds of pulse signals under control of the system controller 31. Based on these pulse signals, the CCD drive circuit 37, an A/D converter 38 and an image signal processing circuit 39 are driven, and operation of the CCD 33 is controlled by the CCD drive circuit 37. Namely, the image signal read from the CCD 33 is converted to digital image data by the A/D converter 38, and is then subjected to a predetermined process by the image signal processing circuit 39. A buffer memory 40, having a capacity large enough to store a frame of digital image data, is connected to the image signal processing circuit 39.

A monitor interface 41 and a card interface 42 are connected to the image signal processing circuit 39. These interfaces 41 and 42 are controlled by the system controller 31. A back light 45 and the liquid crystal display panel (LCD) 46 are connected to the monitor interface 41 through a liquid crystal display drive circuit 44. Based on the image data read from the buffer memory 40, the liquid crystal display drive circuit 44 is controlled so that the still image is indicated by the liquid crystal display panel 46, as described above. A card connector 47 is connected to the card interface 42, and a PC card 43 is attached to the card connector 47.

An AF sensor 51 and a photometry sensor 52 are connected to the system controller 31. The AF sensor 51 has a known construction, from which the focusing condition of the lens groups 14 and 15 is sensed. A photometry is performed using the photometry sensor 52, so that the opening degree of the aperture 16 in an exposure and an electric charge accumulation period (i.e., an exposure period) of the CCD 33 are determined.

A photometry switch 53, a release switch 54 and the condition indicating device 55 are connected to the system controller 31. The photometry switch 53 is turned ON by partly depressing the shutter button 93, so that a photometry is carried out by the photometry sensor 52. The release switch 54 is turned ON by fully depressing the shutter button 93, hence activating the mirror drive circuit 34 and the shutter drive circuit 35 as previously described. Namely, the CCD 33 is exposed, and thus an image signal corresponding to an image is generated in the CCD 33.

The photographing mode set switch 97, the record switch 98 and the other operation switches 99 are connected to the system controller 31.

Figure 3A:
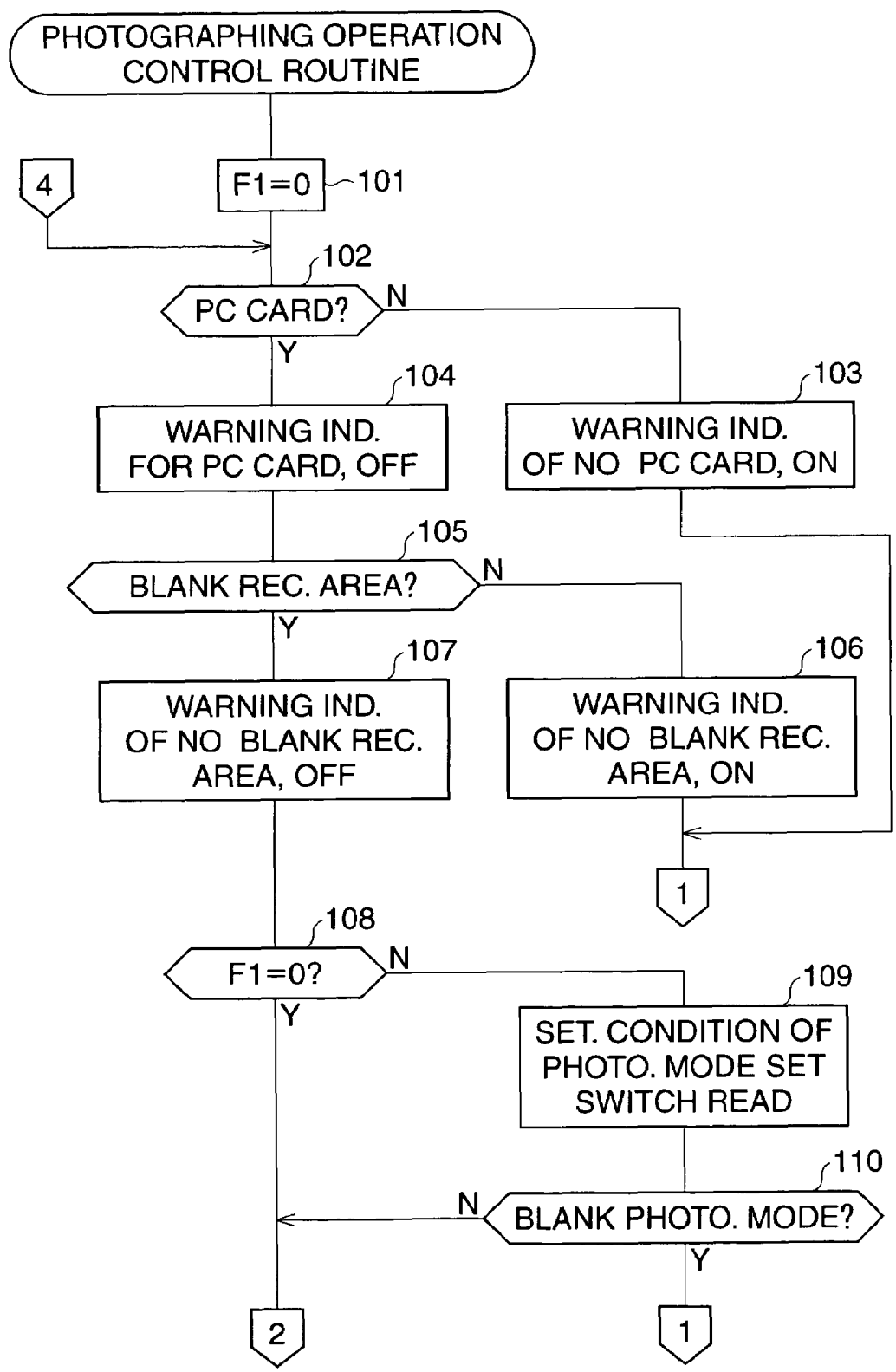
FIGS. 3A, 3B and 3C show a flow chart of a photographing operation control routine.
Figure 3B:
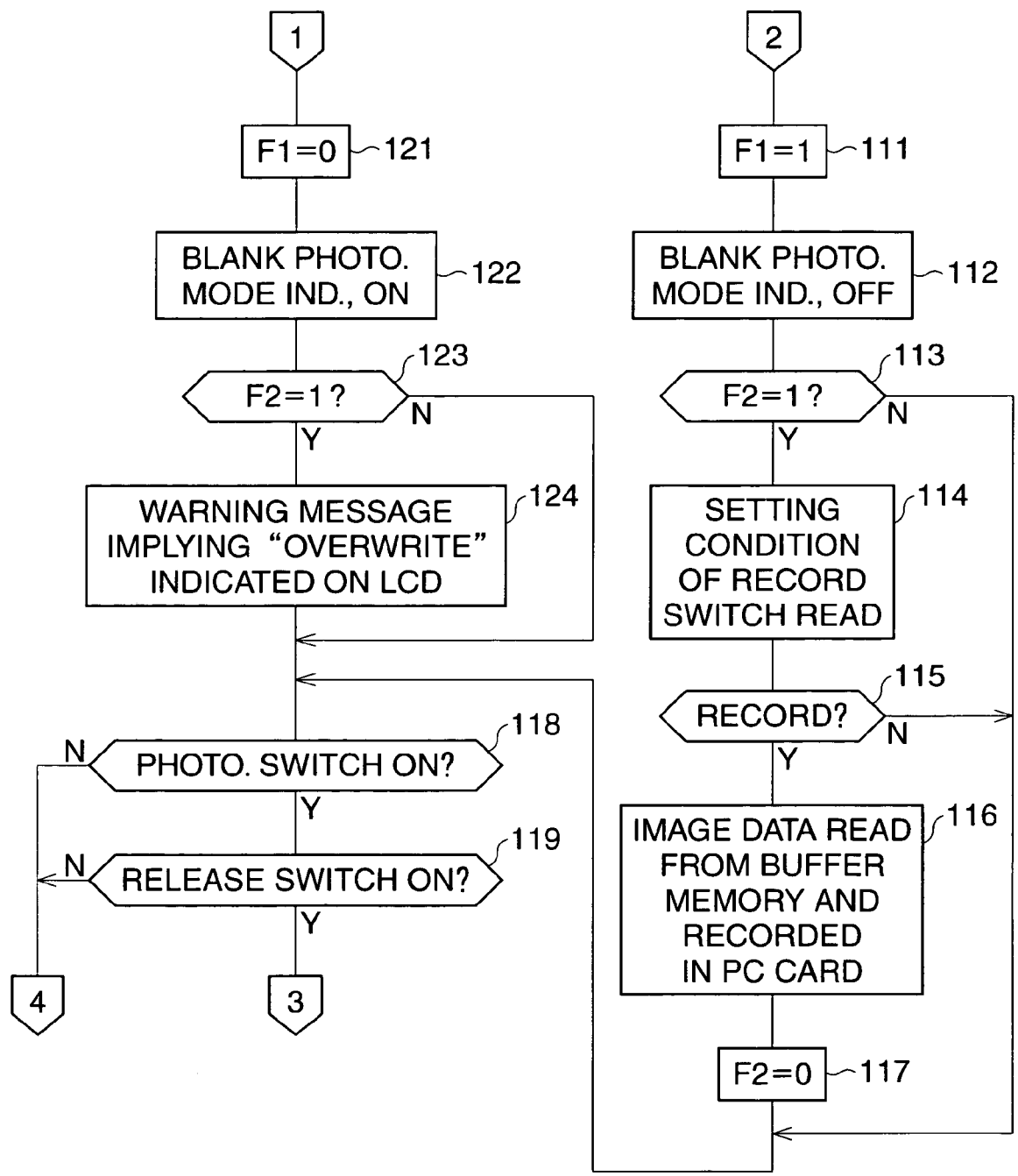
Figure 3C:
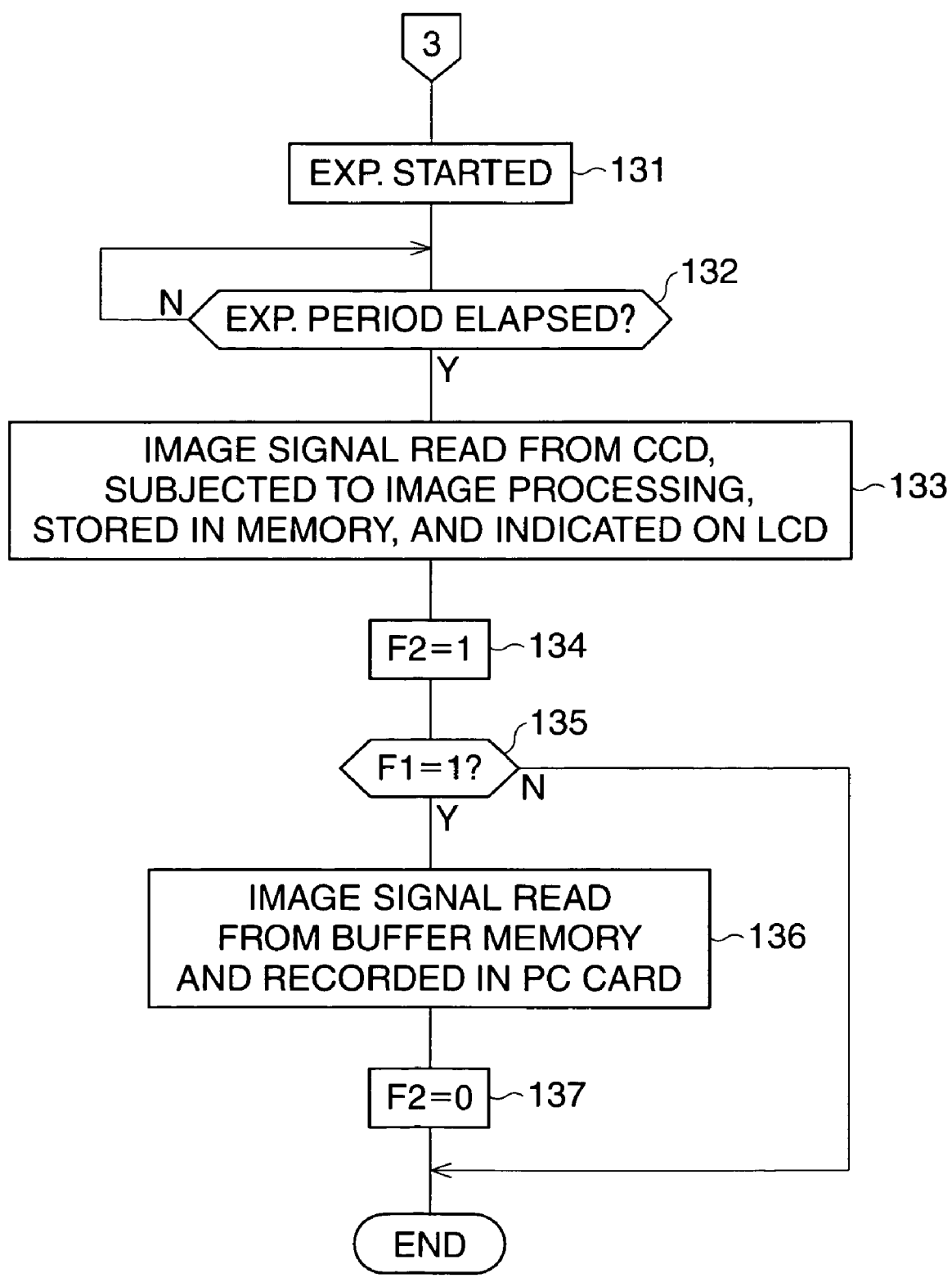

FIGS. 3A, 3B and 3C show a flow chart of a photographing operation control routine of the electronic still camera. The photographing operation control routine is executed in the system controller 31, and is started by turning ON a mains witch (i.e., an electric power switch) of the electronic still camera.

In Step 101, a photographing mode flag F1 is set to an initial value "0". As described later, the photographing mode flag F1 is set to "1" when the normal photographing mode is selected, and is set to "0" when the blank photographing mode is selected. In Step 102, it is determined whether the PC card (i.e., a recording medium) 43 is attached to the card connector 47. The attachment is sensed by detecting a voltage value at a predetermined terminal of the card connector 47. When the PC card 43 is not attached to the card connector 47, Step 103 is executed in which a warning indication, informing that the PC card 43 is not attached, is turned ON in the condition indicating device 55. Conversely, when the PC card 43 is attached, Step 104 is executed in which the warning indication is turned OFF.

Then, Step 105 is executed, in which it is determined whether a blank recording area, which is large enough to record an image data of one frame, exists in the PC card 43. The size of the blank recording area is recognized by reading information recorded in a header of the PC card 43. When there is no sufficient blank recording area, Step 106 is executed, in which a warning indication, for informing that there is no sufficient blank recording area, is turned ON in the condition indicating device 55. Conversely, when there is a sufficient blank recording area, Step 107 is executed in which the warning indication is turned OFF.

Therefore, when the PC card 43 is attached and there is a sufficient blank recording area in the PC card 43, Steps 102, 104, 105 and 107 are executed in order and the process then goes to Step 108. Firstly, under condition that the PC card 43 is attached and has sufficient blank recording area, Step 108 and the following Steps are described below.

In Step 108, it is determined whether the photographing mode flag F1 is "0". When Step 108 is executed for the first time, since the photographing mode flag F1 is set to "0" in Step 101, the process goes to Step 111, in which the photographing mode flag F1 is changed to "1" indicating a normal photographing mode. Then, in Step 112, a blank photographing mode indication, informing that the blank photographing mode is set, is turned OFF in the condition indicating device 55.

In Step 113, it is determined whether a non-record flag F2 is "1". The non-record flag F2 is set to "1" when there is any image data, which is not recorded in the PC card 43 but stored in the buffer memory 40. The non-record flag F2 is set to "0" when there is no image data, which is stored in the buffer memory 40 and has not yet been recorded in the PC card 43. When the non-record flag F2 is "1", Step 114 is executed in which the position of the record switch 98, which is provided for transmitting image data stored in the buffer memory 40 to the PC card 43, is read. In Step 115, the position of the record switch 98 is judged, so that, when the image data is to be recorded in the PC card 43, Steps 116, 117 and Step 118 are executed. Conversely, when the image data is not to be recorded in the PC card 43, Steps 116 and 117 are skipped and Step 118 is executed.

In Step 116, the image data is read from the buffer memory 40 and recorded in the PC card 43. In Step 117, the non-record flag F2 is set to "0".

In Step 118, it is determined whether the photometry switch 53 is set to an ON-state. When the photometry switch 53 is turned OFF, the process goes back to Step 102, and when the photometry switch 53 is turned ON, Step 119 is executed in which it is determined whether the release switch 54 is turned ON. When the release switch 54 is not turned ON, the process goes back to Step 102, and when the release switch 54 is turned ON, the process goes to Step 131, so that a photographing operation is performed.

In Step 131, an exposure is started. Namely, based on photometry data sensed by the photometry sensor 52, the opening degree of the aperture 16 is adjusted, and the shutter speed is calculated. Then, the quick return mirror 21 is rotated to a horizontal state and the shutter 25 is opened, so that the exposure is started. In Step 132, it is determined whether the exposure period corresponding to the shutter speed calculated in Step 131 has elapsed. When the exposure period has elapsed, the process goes to Step 133, in which an image signal is read from the CCD 33 and is converted to a digital signal by the A/D converter 38. Then, the digital signal is subjected to a predetermined image process in the image signal processing circuit 39 and stored in the buffer memory 40 as digital image data. Further, the digital image data is output to the liquid crystal display drive circuit 44, so that a still image is indicated on the liquid crystal display panel 46.

In Step 134, the non-record flag F2 is set to "1", since the image data has been stored in the buffer memory 40 in Step 133. In Step 135, it is determined whether the photographing mode flag F1 is "1". When the photographing mode flag F1 is "1", i.e. when the normal photographing mode is set, Step 136 is executed in which the image data is read from the buffer memory 40 and recorded in the PC card 43. In Step 137, the non-record flag F2 is set to "0" so as to indicate that no image data is stored in the buffer memory 40 and the photographing operation control routine ends. Conversely, when the photographing mode flag F1 is "0", Steps 136 and 137 are skipped, and the routine ends As described above, when the process goes from Step 108 to Step 111, the photographing mode flag F1 is set to "1" so that the normal photographing mode is performed. Then, if image data is stored in the buffer memory 40 (i.e. if the non-record flag F2 is "1"), the image data is transmitted to the PC card 43 in Step 116 and the process goes to Step 118 so that a photographing operation can be performed. Conversely, if image data is not stored in the buffer memory 40 (i.e. if the non-record flag F2 is "0"), the process goes to Step 118 without performing Steps 114 through 117 so that a photographing operation can be performed. In the photographing operation, after the image data is stored in the buffer memory 40 in Step 133, the image data is read from the buffer memory 40 and recorded in the PC card 43 in Step 136.

Further, in the normal photographing mode, if it is sensed in Step 118 that the photometry switch 53 is switched OFF, or if it is sensed in Step 119 that the release switch 54 is switched OFF, Step 102 is again executed. Then, after Steps 104, 105 and 107 are executed, it is determined in Step 108 that the photographing mode flag F1 is "1", and therefore Steps 109 and 110 are executed. Namely, in Step 109, the setting of the photographing mode set switch 97 is read, and in Step 110, it is determined whether a blank photographing mode is selected. When the blank photographing mode is selected, the process goes to Step 121, and when the blank photographing mode is not selected, i.e. when the normal photographing mode is set, the process goes to Step 111.

In Step 121, the photographing mode flag F1 is changed to "0" which indicates the blank photographing mode. In Step 122, the blank photographing mode indicator, to inform that the blank photographing mode is set, is turned ON in the condition indicating device 55. In Step 123, it is determined whether the non-record flag F2 is "1". When the non-record flag F2 is "1", i.e. when image data is stored in the buffer memory 40, the process goes to Step 124, in which a warning message is indicated in the condition indicating device 55, informing that, if the photographing operation is carried out, new image data will overwrite the buffer memory 40. When the non-record flag F2 is "0", Step 124 is skipped.

Then, Steps 118 and 119 are executed, in which, as described above, if the photometry switch 53 and the release switch 54 are turned ON, the process goes to Step 131. In the blank photographing mode, Steps 131 through 135 are executed and Steps 136 and 137 are not executed since the photographing mode flag F1 is "0". Namely, in the blank is photographing mode, a photographed image data is stored only in the buffer memory 40 and is not recorded in the PC card 43.

On the other hand, if the photometry switch 53 or the release switch 54 is switched to the OFF position in the blank photographing mode, the process goes back from Step 118 or 119 to Step 102, so that Steps 104, 105, 107 and 108 are repeated. In this case, since the photographing mode flag F1 is switched to "0" in Step 121, the process goes from Step 108 to Step 111, the photographing mode flag F1 is again switched to "1". Then, Step 112 and the following Steps are executed.

Thus, when the PC card 43 is installed and a blank recording area, which is large enough to record image data of one frame, exists in the PC card 43, a photographing operation is carried out in the normal photographing mode in Steps 111 through 119, and 131 through 137, or a photographing operation is carried out in the blank photographing mode in Steps 121 through 124, 118, 119, and 131 through 135. During the photographing operation, if the photometry switch 53 or the release switch 54 is switched to the OFF-state, the process goes back to Step 102, so that, when the normal photographing mode is set, the process goes from Step 108 to Step 109, and Step 110 is executed. Accordingly, the photographing mode can be changed to the blank photographing mode.

On the other hand, when it is sensed in Step 102 that the PC card 43 is not installed, a message is indicated by the condition indicating device 55 and the process goes from Step 103 to Step 121, so that the blank photographing mode is performed. Similarly, when it is sensed in Step 105 that no sufficient blank recording area exists in the PC card 43, Step 106 is executed in which a message warning that there is no sufficient blank recording area is indicated by the condition indicating device 55, and the process goes to Step 121, so that the blank photographing mode is performed.

Thus, when the PC card 43 is not attached, or when there is not sufficient blank recording area in the PC card 43, a photographing operation is automatically performed in accordance with the blank photographing mode.

Therefore, according to the embodiment, when a test photographing is carried out, it is not necessary to install the PC card 43 in the electronic still camera and the photographing operation ends while the image data is stored in the buffer memory 40. Namely, an operation does not have to be performed, in which the image data is transferred from the buffer memory 40 to the PC card 40 so that the image data is recorded in the PC card 40, and thus the test photographing operation can be repeatedly and promptly carried out. Further, even if the size of the blank recording area of the PC card 43 installed in the electronic still camera is not sufficient, the blank photographing mode is automatically selected and the photographing operation ends by storing the image data in the buffer memory 40. After that, the operator can install a PC card having sufficient memory in the electronic still camera, and can then operate the record switch 98 so that only a recording operation is carried out. Therefore, even if there is not sufficient time for changing the PC card, a photographing operation can be performed, and thus the operator has not missed a shutter chance.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-272512 (filed on Sep. 27, 1999) which is expressly incorporated herein, by reference, in its entirety.

The invention claimed is:

1. A photographing operation control device for an electronic still camera, comprising:
   a volatile buffer memory that temporarily stores image data obtained through a photographing optical system and is configured to overwrite the image data with subsequent image data obtained from a subsequent photographing operation;
   a blank photographing operation performing processor that performs a photographing operation in a blank photographing mode, such that upon photographing, said image data is stored in said buffer memory without being stored in a recording medium, when no recording medium is installed in the electronic still camera, when a recording medium without a blank recording area sufficient to store said image data is installed in the electronic still camera, and when a recording medium, having a blank recording area sufficient to store said image data, is installed in the electronic still camera;
   a recording medium sensing processor that senses whether the recording medium is mounted;
   a blank recording area sensing processor that senses whether a blank recording area exists in the recording medium;
   a normal photographing operation performing processor that performs a photographing operation in a normal photographing mode in which, after storing said image data in said buffer memory, said image data is read from said buffer memory and recorded in the recording medium;
   a photographing mode selecting processor that selects one of said blank photographing mode and said normal photographing mode, said photographing mode selecting processor being able to select said blank photographing mode when said recording medium sensing processor and said blank recording area sensing processor sense that the recording medium having the blank recording area is installed in said device,
   wherein said blank photographing operation performing processor performs said photographing operation in said blank photographing mode when said recording medium sensing processor senses that said recording medium is not mounted; and
   wherein the volatile buffer memory is configured such that, in the blank photographing mode, image data in the volatile buffer memory is overwritten with the subsequent image data without previously having been transferred to the recording medium.

2. A device according to claim 1, wherein said photographing mode selecting processor comprises a photographing mode set switch, by which said blank photographing mode is set, and which is provided in a camera body of the electronic still camera.

3. A device according to claim 1, wherein said blank photographing operation performing processor performs said photographing operation in said blank photographing mode when said blank recording area sensing processor senses that the recording medium has no blank recording area.

4. A device according to claim 1, further comprising an image data transfer processor that transfers said image data stored in said buffer to the recording medium.

5. A device according to claim 4, wherein said image data transfer processor transfers said image data to the recording medium when said normal photographing mode is set.

6. A device according to claim 1, further comprising a mode informing processor that informs that said blank photographing mode is set.

7. A device according to claim 1, further comprising a non-mounting condition informing processor that informs that the recording medium is not mounted.

8. A device according to claim 1, further comprising a non-existing condition informing processor that informs that the recording medium has no blank recording area.

9. The photographing operation control device according to claim 1, wherein, upon a change from the blank photographing mode to the normal photographing mode, image data stored in the volatile buffer memory is transferred to the recording medium.

10. The photographing operation control device according to claim 1, wherein in the normal photographing mode, all image data recorded in the recording medium has been transferred to the recording medium from the volatile buffer memory.

11. The photographing operation control device according to claim 1, wherein repeated photographing operations in the blank photographing mode overwrite image data in the volatile buffer memory without an intervening transfer of the overwritten image data to the recording medium.

12. The photographing operation control device according to claim 1, wherein, upon selection of the blank photographing mode, the presence of image data in the volatile buffer memory that has not been transferred to the recording medium is checked and an indication is provided when untransferred image data is present in the volatile buffer memory.

13. The photographing operation control device according to claim 1, wherein when said recording medium sensing processor senses that said recording medium is not mounted, and said blank photographing operation performing processor performs the photographing operating in the blank photographing mode, the blank photographing operation performing processor does not transmit image data stored in the buffer memory to a recording medium when the recording medium is mounted.

14. A photographing operation control device for an electronic still camera, comprising:
   a system controller;
   a volatile buffer memory for temporarily storing image data and which is configured to overwrite the image data with subsequent image data obtained from a subsequent photographing operation;

a photographing mode set switch for switching a photographing operation between a normal photographing mode and a blank photographing mode, wherein, when said photographing operation is set to said normal photographing mode and an image is photographed, said system controller temporarily stores image data in said buffer memory and subsequently automatically transfers said image data to a recording medium, wherein when said photographing operation is set to said blank photographing mode and an image is photographed, said system controller stores image data in said buffer memory and does not automatically transfer said image data to a recording medium, wherein when a recording medium is not installed in said electronic still camera, said system controller automatically sets said photographing operation to said blank photographing mode, and when a recording medium is installed but does not include a blank recording area sufficient to store image data, said system controller automatically sets said photographing operation to said blank photographing mode; and wherein the volatile buffer memory is configured such that, in the blank photographing mode, image data in the volatile buffer memory is overwritten with the subsequent image data without previously having been transferred to the recording medium.

15. The photographing operation control device according to claim 14, wherein, upon a change from the blank photographing mode to the normal photographing mode, image data stored in the volatile buffer memory is transferred to the recording medium.

16. The photographing operation control device according to claim 14, wherein in the normal photographing mode, all image data recorded in the recording medium has been transferred to the recording medium from the volatile buffer memory.

17. The photographing operation control device according to claim 14, wherein repeated photographing operations in the blank photographing mode overwrite image data in the volatile buffer memory without an intervening transfer of the overwritten image data to the recording medium.

18. The photographing operation control device according to claim 14, wherein, upon selection of the blank photographing mode, the presence of image data in the volatile buffer memory that has not been transferred to the recording medium is checked and an indication is provided when untransferred image data is present in the volatile buffer memory.

* * * * *